(12) United States Patent
Kim et al.

(10) Patent No.: US 12,174,520 B2
(45) Date of Patent: Dec. 24, 2024

(54) ACTUATOR MODULE OF VEHICLE HEAD-UP DISPLAY

(71) Applicant: HYUNDAI MOBIS CO., LTD., Seoul (KR)

(72) Inventors: Byung Ki Kim, Yongin-si (KR); Jin Wan Ahn, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 512 days.

(21) Appl. No.: 17/323,588

(22) Filed: May 18, 2021

(65) Prior Publication Data

US 2021/0364780 A1    Nov. 25, 2021

(30) Foreign Application Priority Data

May 19, 2020    (KR) .......................... 10-2020-0059710
Jul. 10, 2020    (KR) .......................... 10-2020-0085569

(51) Int. Cl.
*G03B 21/14*    (2006.01)
*B60K 35/00*    (2006.01)
(Continued)

(52) U.S. Cl.
CPC .............. *G03B 21/14* (2013.01); *B60K 35/00* (2013.01); *G03B 21/145* (2013.01); *B60K 35/22* (2024.01);
(Continued)

(58) Field of Classification Search
CPC ................. G03B 21/14; G03B 21/145; B60K 2370/1529; B60K 35/00; B60K 2370/166;
(Continued)

(56) References Cited

U.S. PATENT DOCUMENTS

| 6,950,244 B2 * | 9/2005 | Makii | ...................... | G02B 7/10 |
| | | | | 359/823 |
| 2014/0368941 A1* | 12/2014 | Sato | ...................... | G02B 7/1827 |
| | | | | 359/877 |

(Continued)

FOREIGN PATENT DOCUMENTS

JP    5348459 B2    11/2013
KR    101597741 B1 *    2/2016
(Continued)

OTHER PUBLICATIONS

KR101597741B1 English translation (Year: 2023).*
(Continued)

*Primary Examiner* — Christopher M Koehler
*Assistant Examiner* — Viswanathan Subramanian
(74) *Attorney, Agent, or Firm* — NovoTechIP International PLLC

(57) ABSTRACT

An actuator module of a vehicle head-up display according to one embodiment of the present invention includes a driving unit including a driving motor and a lead screw forming a driving axis of the driving motor, a driving transmission unit of which upward and downward movement is controlled only within a section preset by the driving unit, a link unit which is disposed between and connected to an aspheric mirror and the driving transmission unit and adjusts a rotational angle of the aspheric mirror according to the upward and downward movement of the driving transmission unit, a motor mount which is connected to one side of the driving unit and has a space in which an adjacent component and a plurality of cables are installable, and an elastic part which is disposed between and connected to the driving unit and the driving transmission unit and provides an elastic force.

9 Claims, 14 Drawing Sheets

(51) Int. Cl.
- *B60K 35/22* (2024.01)
- *B60K 35/23* (2024.01)
- *B60K 35/28* (2024.01)
- *B60K 35/53* (2024.01)
- *G02B 26/08* (2006.01)
- *G02B 27/01* (2006.01)

(52) U.S. Cl.
CPC .............. *B60K 35/23* (2024.01); *B60K 35/28* (2024.01); *B60K 35/53* (2024.01); *B60K 2360/166* (2024.01); *B60K 2360/167* (2024.01); *G02B 26/0816* (2013.01); *G02B 27/0149* (2013.01)

(58) Field of Classification Search
CPC .......... B60K 2370/167; B60K 2370/67; G02B 26/0816; G02B 27/0149; G02B 2027/0154; G02B 7/1827; G02B 27/646; G02B 7/1821
See application file for complete search history.

(56) References Cited

U.S. PATENT DOCUMENTS

| | | | |
|---|---|---|---|
| 2016/0139410 A1* | 5/2016 | Shin | G02B 27/0179 |
| | | | 359/631 |
| 2017/0336632 A1* | 11/2017 | Ushida | G02B 27/0149 |
| 2018/0059417 A1* | 3/2018 | Furusawa | G02B 27/01 |
| 2019/0086663 A1* | 3/2019 | Hatasako | G02B 27/0179 |
| 2019/0107717 A1* | 4/2019 | Heinrich | G02B 27/01 |

FOREIGN PATENT DOCUMENTS

| | | | |
|---|---|---|---|
| KR | 20160059806 A | | 5/2016 |
| KR | 20170069334 A | * | 6/2017 |
| KR | 20190051456 A | | 5/2019 |
| KR | 10-22530050000 B | | 5/2021 |

OTHER PUBLICATIONS

KR20170069334A English translation (Year: 2024).*
Office Action issued on Sep. 10, 2024 in corresponding Korean patent application No. 10-2020-0059710.

* cited by examiner

ACTUATOR MODULE OF VEHICLE HEAD-UP DISPLAY

CROSS-REFERENCE TO RELATED APPLICATION

This application claims priority to and the benefit of Korean Patent Application No. 10-2020-0059710, filed on May 19, 2020, and Korean Patent Application No. 10-2020-0085569, filed on Jul. 10, 2020, the disclosure of which are incorporated herein by reference in its entirety.

BACKGROUND

1. Field of the Invention

The present invention relates to an actuator module of a vehicle head-up display.

2. Discussion of Related Art

Recently, products for supporting stability and convenience of drivers have been commercialized, and among them, vehicle head-up displays (HUDs) with various product lines are drawing attention.

Generally, the vehicle HUD is a device which displays an image including information about a vehicle speed, a remaining fuel amount, and a route on a windshield which is a front window of a vehicle or combiner.

Among components of the vehicle head-up display, an aspheric mirror rotates while in point-contact with a driven power transmission unit. In this case, since external forces due to vibration, acceleration, and friction are concentrated at one point, wear or deformation thereof may occur.

The wear or deformation of the aspheric mirror may cause precision degradation and may also be directly related to optical performance degradation of a system, and thus a difficulty in securing strength may occur when an impact test is performed.

In addition, when the aspheric mirror is rotationally driven, a high-resolution rotation-angle is required. However, since a conventional actuator module depends on a pitch of a lead screw and the resolution of a step motor, there has been a limitation.

SUMMARY OF THE INVENTION

The present invention is directed to providing an actuator module capable of reducing a load of a driving unit by using an elastic force of an elastic part and preventing generation of a gap at a contact part for driving an aspheric mirror.

Objectives to be solved by the present invention are not limited to the above-described objectives, and other objectives that are not described above will be clearly understood by those skilled in the art from the following description.

According to one aspect of the present invention, there is provided an actuator module of a vehicle head-up display, the actuator module including a driving unit including a driving motor and a lead screw forming a driving axis of the driving motor, a driving transmission unit of which upward and downward movement is controlled only within a section preset by the driving unit, a link unit which is positioned between and connected to an aspheric mirror and the driving transmission unit and adjusts a rotational angle of the aspheric mirror according to the upward and downward movement of the driving transmission unit, a motor mount which is connected to one side of the driving unit and has a space in which an adjacent component and a plurality of cables are installable, and an elastic part which is positioned between and connected to the driving unit and the driving transmission unit and provides an elastic force.

The driving transmission unit may include a main body of which upward and downward movement is controlled in a longitudinal direction according to rotational driving of the lead screw, a slot formed in a structure, which extends from the main body and of which one surface is open, and coupled to a link pin formed on an end portion of the link unit, and a clip configured to prevent a gap from being generated between the link pin and the slot.

The slot may include a pair of first and second grip members extending from upper and lower end portions of the main body toward the other side of the driving unit to be spaced apart from each other, and the clip may have a leaf spring structure positioned on any one of inner side surfaces of the first and second grip members of the slot in order for the link pin not to be withdrawn from the slot.

The clip may be snap-fit-coupled to any one of the inner side surfaces of the first and second grip members of the slot.

The driving unit may include a lower frame which surrounds the driving motor in a state in which the lead screw passes through the lower frame, an upper frame which surrounds an end portion of the lead screw in a longitudinal direction such that the end portion is rotatable, and a guide shaft formed between the lower frame and the upper frame to be parallel to the lead screw in a state in which the guide shaft is spaced from the lead screw.

In this case, the lower frame may include a motor pad formed of a rubber material which reduces vibration of the driving motor.

The upper frame may include a switch which is positioned on a moving passage of the driving transmission unit that moves in the longitudinal direction of the lead screw and may be in contact with the driving transmission unit, and the switch may be positioned at an end of the moving passage of the driving transmission unit that moves in the longitudinal direction and may detect a driving end point of the aspheric mirror.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Advantages and features of the present invention and methods of achieving the same will be clearly understood with reference to the following embodiments and the accompanying drawings. However, the present invention is not limited to the embodiments to be disclosed below and may be implemented in various different forms. The embodiments are provided in order to fully explain the present invention and fully explain the scope of the present invention for those skilled in the art. The scope of the present invention is only defined by the appended claims. Meanwhile, the terms used herein are provided only to describe the embodiments of the present invention and not for purposes of limitation. Unless the context clearly indicates otherwise, the singular forms include the plural forms. The terms "comprise" and "comprising," when used herein, specify some stated components, steps, operations and/or elements but do not preclude the presence or addition of one or more other components, steps, operations and/or elements.

Hereinafter, exemplary embodiments of the present invention will be described in detail with reference to the accompanying drawings.

First Embodiment

Figure 1:
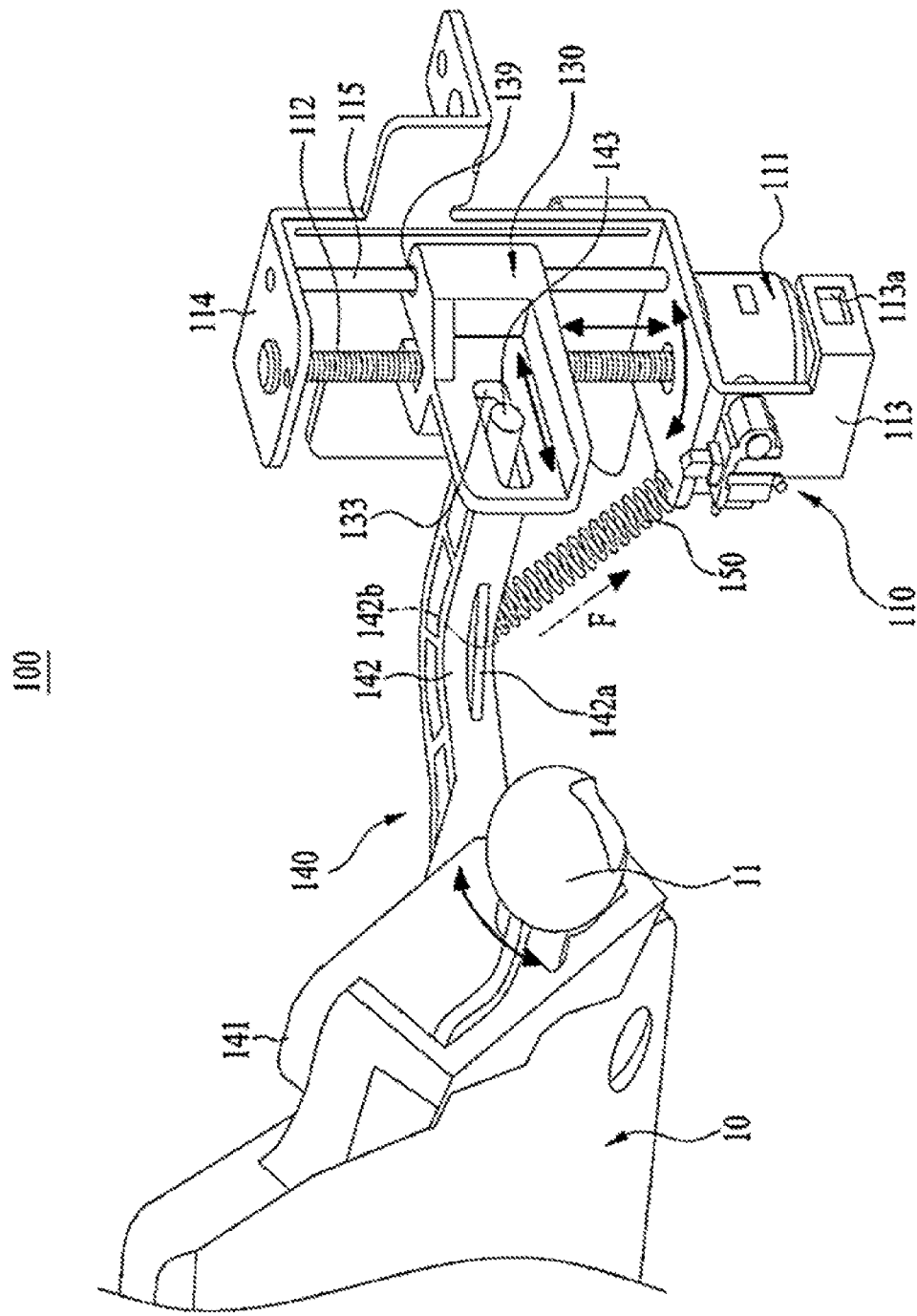
FIG. 1 is a schematic view illustrating an actuator module of a vehicle head-up display according to a first embodiment of the present invention.

FIG. 1 is a schematic view illustrating an actuator module of a vehicle head-up display according to a first embodiment of the present invention.

Referring to FIG. 1, an actuator module 100 of a vehicle head-up display mainly includes a driving unit 110, a driving transmission unit 130, a link unit 140, and an elastic part 150.

The above components will be described first, and an operational relationship of the actuator module 100 will be described.

First, the driving unit 110 is controlled by a controller (not shown) of a vehicle and provides driving power of the vehicle. The driving unit 110 includes a driving motor 111, a lead screw 112, a lower frame 113, an upper frame 114, and a guide shaft 115.

The driving motor 111 includes the lead screw 112 forming an axis. In this case, the lead screw 112 is connected to a shaft of the driving unit 110 and rotated and may be integrally formed with the driving unit 110 or may be formed as a detachable structure which allows assembly and separation.

The lower frame 113 surrounds the driving motor 111 in a state in which the lead screw 112 passes through the lower frame 113. The lower frame 113 includes a coupling unit (not shown) connected to the elastic part 150.

The upper frame 114 extends from the lower frame 113. The upper frame 114 surrounds an end portion of the lead screw 112 in a longitudinal direction such that the end portion is rotatable. In this case, a precondition of surrounding the end portion of the lead screw 112 is that a rotation function of the lead screw 112 may be maintained.

Accordingly, the upper frame 122 may surround the end portion of the lead screw 112 in the longitudinal direction such that the end portion is rotatable. As an example, the upper frame 122 may include a rotatable member such as a bearing at an inner portion in contact with the lead screw 112.

The guide shaft 115 is formed between the lower frame 113 and the upper frame 114 to be spaced apart from and parallel to the lead screw 112. The guide shaft 115 serves an auxiliary function of the lead screw 112.

Next, upward and downward movement of the driving transmission unit 130 in the longitudinal direction of the lead screw 112 is controlled by the driving unit 110.

In this case, the driving transmission unit 130 moves the other end of the link unit 140 in an arc shape. A guide hole 139 through which the guide shaft 115 passes is formed in the driving transmission unit 130.

A bearing (not shown) may be provided in the guide hole 139 in order to reduce friction with the guide shaft 115 when the upward and downward movement of the driving transmission unit 130 is controlled.

The link unit 140 is positioned between and connected to the driving transmission unit 130 and an aspheric mirror 10. The link unit 140 rotates the aspheric mirror 10 in an axial direction in conjunction with the driving transmission unit 130.

In this case, spherical mounts 11 are formed at both ends of the aspheric mirror 10 to be rotatably connected.

In addition, the axial direction denotes a direction of an axis about which the spherical mounts 11 positioned at both ends of the aspheric mirror 10 rotate.

The link unit 140 includes a fixing plate 141, a link bar 142, and a link pin 143.

The fixing plate 141 is coupled to one side of the aspheric mirror 10. In this case, the fixing plate 141 may be positioned on a side end portion, which is not in contact with the spherical mount 11, of the aspheric mirror 10.

The link bar 142 is formed in a bent shape and extends from the fixing plate 141. In this case, the link bar 142 includes a reinforcing member 142*a* on an inner side portion which is bent.

The link pin 143 protrudes from an end portion of the link bar 142. The link pin 143 passes through a slot 133 formed in the driving transmission unit 130 and has displacement in the slot 133.

Accordingly, there is a high possibility that a portion, which is in contact with the slot 133, of the link pin 143 is worn. To this end, it is useful for the link pin 143 to be detachably formed.

The elastic part 150 is positioned between and connected to the lower frame 113 and the link unit 140 and provides an elastic force thereto.

More specifically, the elastic part 150 is positioned between and connected to a coupling hole 113*a* of the lower frame 113 and a coupling piece 142*b* formed on a lower end portion, which is bent, of the link bar 142.

As illustrated in FIG. 1, the elastic part 150 is provided as a spring and diagonally connected thereto. When the aspheric mirror 10 is rotated in the axial direction, a load which is greater than or equal to about two times that of a conventional actuator (not shown) may be applied. To this end, the elastic part 150 may have an elastic force F corresponding to a rotation driving force of the aspheric mirror 10.

As a result, the elastic part 150 may prevent generation of a backlash of the lead screw 112, a gap of the driving transmission unit 130, and a gap between the slot 133 of the driving transmission unit 130 and the link pin 143.

The operational relationship of the actuator module 100 will be briefly summarized below.

The aspheric mirror 10, the link unit 140, the driving transmission unit 130, and the driving motor 111 have a structure of operating in conjunction with each other.

Accordingly, when the driving motor 111 rotates, the lead screw 112 forming an axis of the driving motor 111 rotates, and upward and downward movement of the driving transmission unit 130, which operates in conjunction with the lead screw 112, is controlled according to forward and reverse rotation of the driving motor 111.

In this case, the link pin 143 of the link unit 140 is provided as a structure in which the link pin 143 passes through the slot 133 of the driving transmission unit 130 and operates in conjunction with the driving transmission unit 130. As the upward and downward movement of the driving transmission unit 130 is controlled, the link unit 140 is moved upward or downward. In this case, the aspheric mirror 10, which operates in conjunction with the link unit 140, is rotated in the axial direction.

As a result, when the driving motor 111 operates, the driving transmission unit 130 moves, and when the driving transmission unit 130 moves, the link unit 140 operates so that the aspheric mirror 10 rotates in the axial direction.

Accordingly, the contact between the elastic part 150 and the driving transmission unit 130 connected to the aspheric mirror 10 is maintained due to the elastic force F so that a driving error is suppressed.

Second Embodiment

Figure 2:
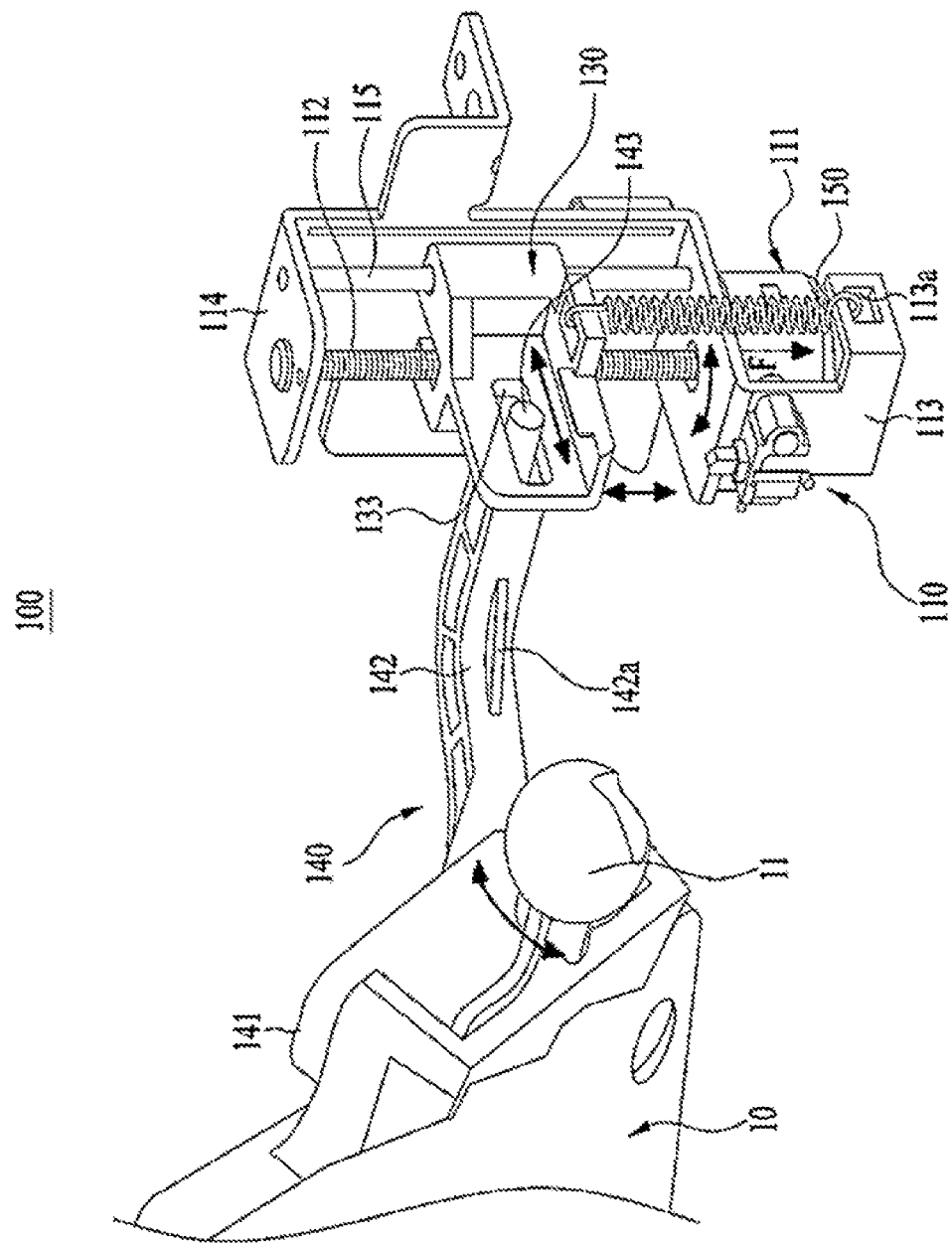
FIG. 2 is a schematic view illustrating an actuator module of a vehicle head-up display according to a second embodiment of the present invention.

FIG. 2 is a schematic view illustrating an actuator module of a vehicle head-up display according to a second embodiment of the present invention.

Referring to FIG. 2, in an actuator module 100 of a vehicle head-up display according to the second embodiment, an elastic part 150 is vertically formed instead of being diagonally formed. In this regard, in the second embodiment, descriptions of components which are the same as those of the first embodiment will be omitted and differences therebetween will be described.

In the second embodiment, the elastic part 150 is arranged to contact with a driving transmission unit 130 and a coupling hole 113*a* of a lower frame 113 to suppress a driving error using an elastic force F. In this case, since the elastic force F of the elastic part 150 may withstand the sum of a backlash and a gap, a load of the driving motor 111 may be reduced.

Third Embodiment

Figure 3:
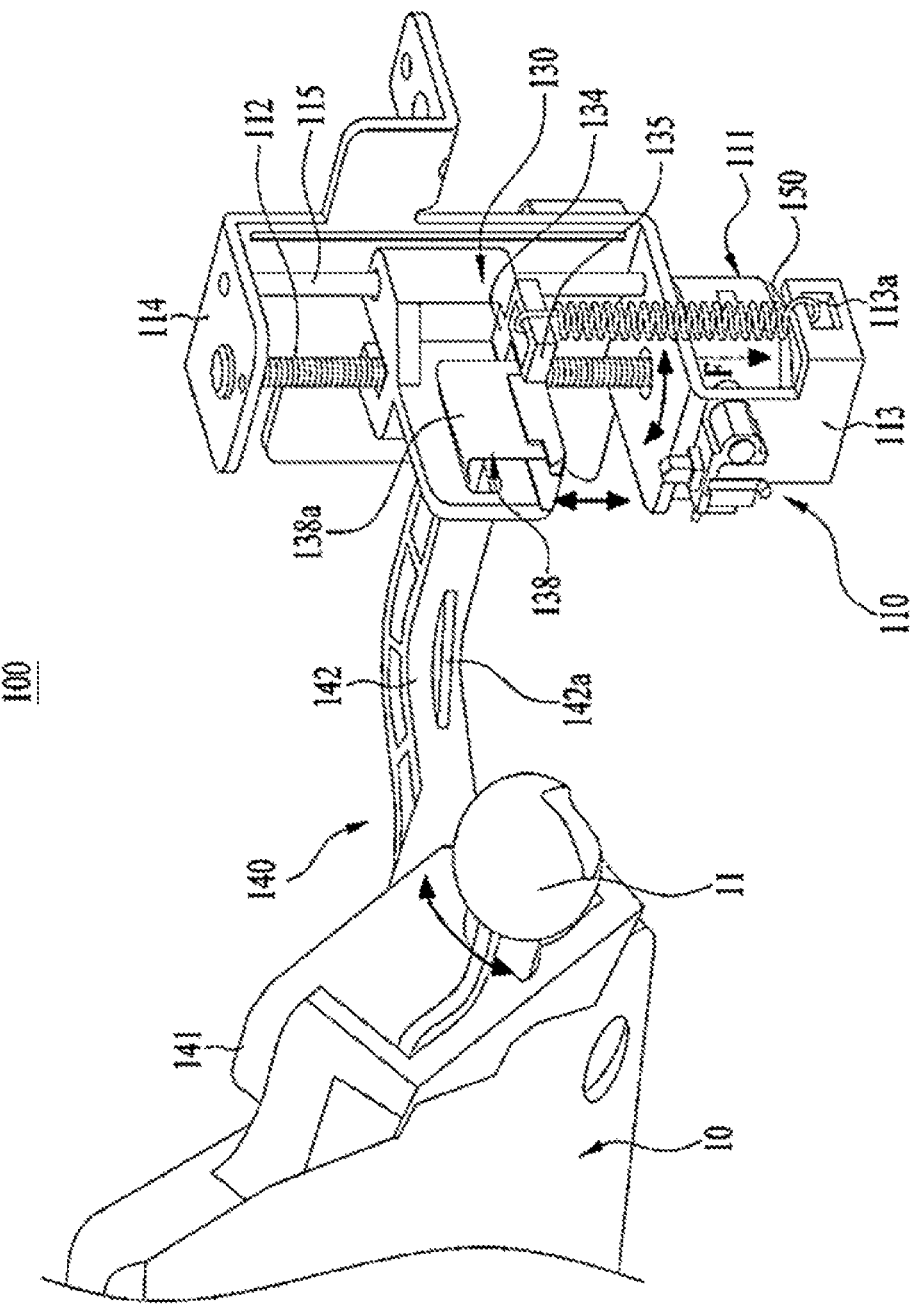
FIG. 3 is a schematic view illustrating an actuator module of a vehicle head-up display according to a third embodiment of the present invention.
Figure 4:
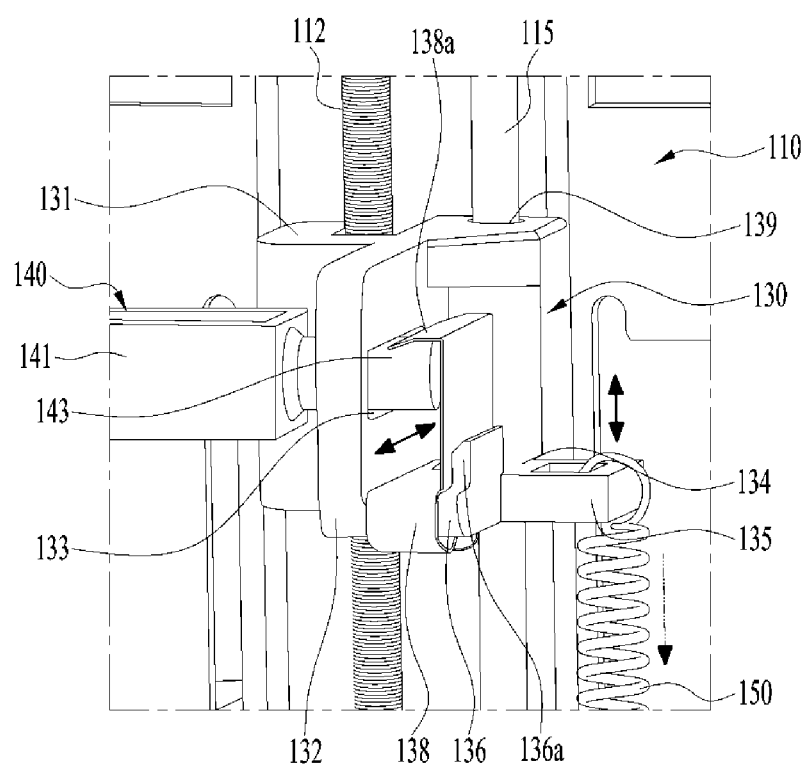
FIG. 4 is an enlarged view illustrating a coupling relationship of a leaf spring in the actuator module of a vehicle head-up display according to the third embodiment of the present invention.

FIGS. 3 and 4 are views a modified embodiment in which a leaf spring is added in an actuator module of a vehicle head-up display according to the third embodiment of the present invention.

Referring to FIGS. 3 and 4 together, upward and downward movement of a driving transmission unit 130 is controlled by a driving motor 111.

The driving transmission unit 130 includes a main body 131, a vertical plate 132, a horizontal plate 134, and a horizontal bracket 135.

Upward and downward movement of the main body 131 is controlled in a longitudinal direction of a lead screw 112.

The vertical plate 132 extends in a forward direction from the main body 131. In this case, the forward direction denotes a direction in which an aspheric mirror 10 faces, and a rearward direction denotes a direction opposite to the forward direction. Then, the vertical plate 132 includes a slot 133 through which a link pin 143 passes.

The horizontal plate 134 extends from a side end of the vertical plate 132.

The horizontal bracket 135 extends from a side end of the horizontal plate 134. The horizontal bracket 135 is a portion connected to the elastic part 150 and is formed in a hollow shape.

The driving transmission unit 130 may further include a seating piece 136, a stepped portion 136*a*, and a leaf spring 138.

The seating piece 136 extends from the side end of the horizontal plate 134. In addition, the seating piece 136 is positioned adjacent to the horizontal bracket 135.

The stepped portion 136*a* extends and protrude upward from a side end of the seating piece 136.

The leaf spring 138 is insertion-coupled to the seating piece 136 in a state in which the leaf spring 138 is in contact with the stepped portion 136*a*.

A hook member 138*a*, which prevents generation of a gap between the link pin 143 and the slot 133 by restricting movement of the link pin 143 passing through the slot 133, is formed on an upper end portion of the leaf spring 138.

In this case, an elastic force F is directly applied to a load of a driving motor 111, and an elastic force of the leaf spring 138 is applied as a sliding force between the driving transmission unit 130 and the link pin 143. Accordingly, a load, which is less than that applied to the elastic part 150, is applied to the leaf spring 138.

Fourth Embodiment

Figure 5:
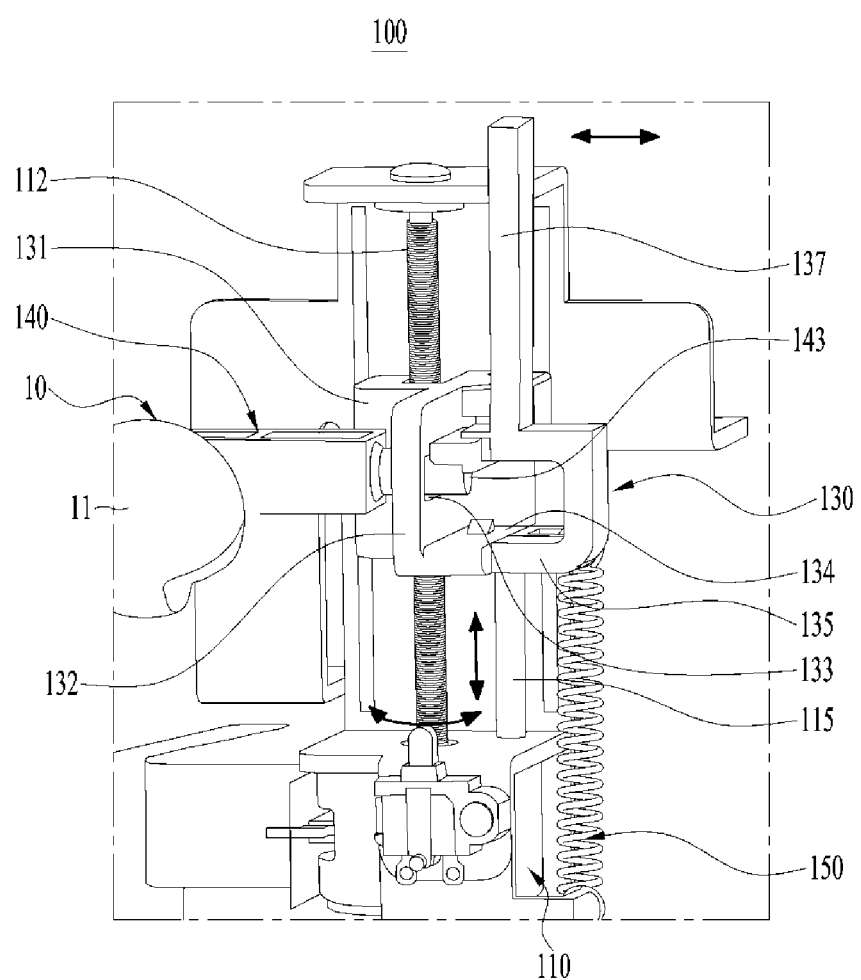
FIG. 5 is a schematic view illustrating an actuator module of a vehicle head-up display according to a fourth embodiment of the present invention.

FIG. 5 is a schematic view illustrating an actuator module of a vehicle head-up display according to a fourth embodiment of the present invention.

Referring to FIG. 5, an end portion of a link pin 143 may be formed in a tapered shape in which a width is increased in a longitudinal direction toward an end to prevent the link pin 143 from being easily withdrawn from a slot 133 in a state in which the link pin 143 is inserted into the slot 133.

A snap stick 137 is formed of a plastic material and provided as a structure in which the snap stick 137 is bent inward and outward in a lateral direction from a main body 131 of a driving transmission unit 130 and engaged with the link pin 143. In this case, as a partial portion of the snap stick 137 overlaps the link pin 143 and is engaged therewith, the snap stick 137 has a function of restricting displacement of the link pin 143. That is, the snap stick 137 of FIG. 5 restricts the displacement of the link pin 143 instead of the leaf spring 138 of FIGS. 3 and 4.

In short, the fourth embodiment denotes a structure in which, as the snap stick 137 is deformed in a left-right direction (direction displayed as an arrow at an upper side in FIG. 5), a width of the slot 133 is increased or decreased so that the link pin 143 is easily coupled to or separated from the slot 133 of the driving transmission unit 130.

Fifth Embodiment

Figure 6:
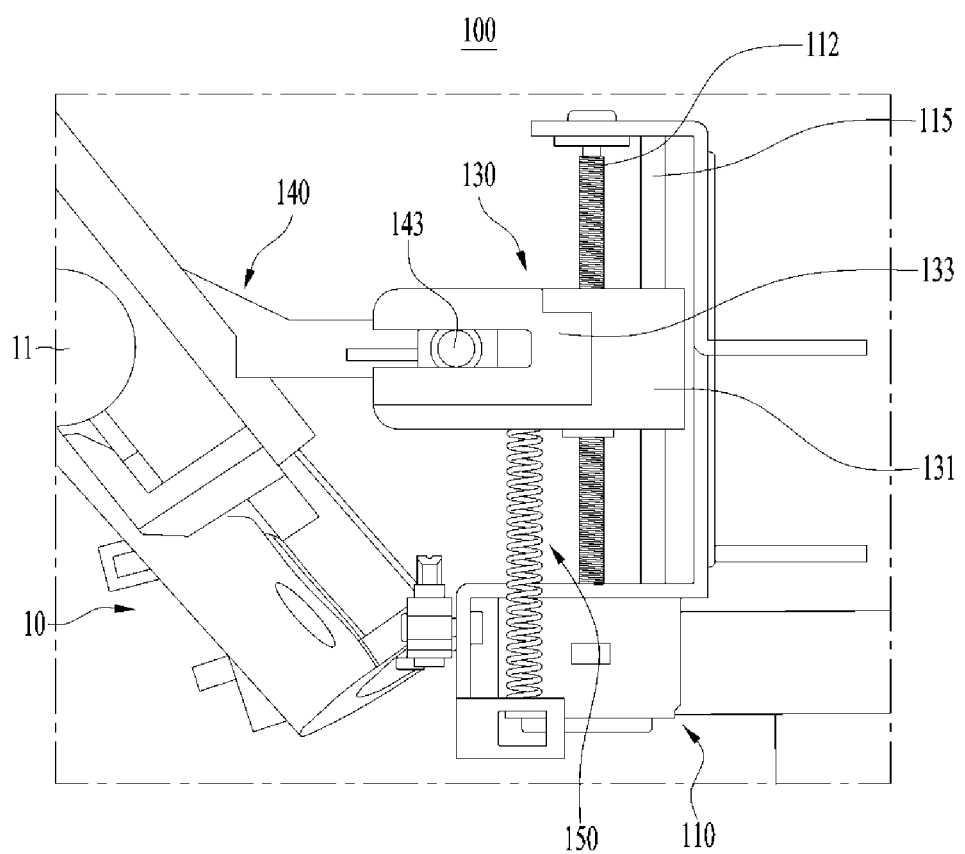
FIG. 6 is a schematic view illustrating an actuator module of a vehicle head-up display according to a fifth embodiment of the present invention.
Figure 7:
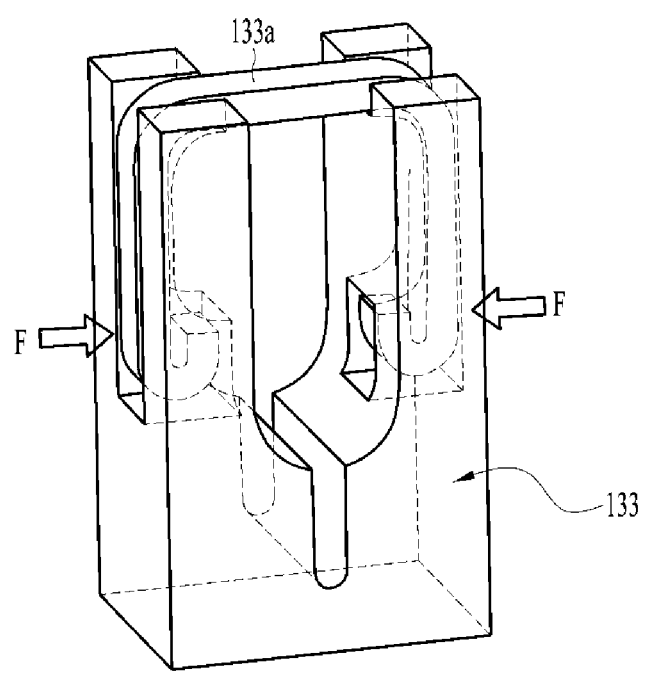
FIG. 7 is a partial view illustrating a coupling relationship between a slot of which one surface is open and a clip in the actuator module of a vehicle head-up display according to the fifth embodiment of the present invention.

FIG. 6 is a schematic view illustrating an actuator module of a vehicle head-up display according to a fifth embodiment of the present invention, and FIG. 7 is a partial view illustrating a coupling relationship between a slot of which one surface is open and a clip.

Referring to FIGS. 6 and 7 together, a structure of restricting displacement of a link pin 143 and a structure of inserting the link pin 143 of an actuator module 100 according to the fifth embodiment are different from those of the above-described embodiments.

A driving transmission unit 130 includes a main body 131, a slot 133, and a clip 133a. The driving transmission unit 130 has a function which is the same as that of each of the driving transmission units 130 (see FIGS. 1 to 5) but has a structure which is different therefrom.

Particularly, the slot 133 extends from a main body 161 and formed in a "U" shape of which one surface is open. This is to easily insert the link pin 143 into the slot 133.

Accordingly, an end portion of the link pin 143 may be formed in a tapered shape in which a width is increased in a longitudinal direction toward an end in order to prevent the link pin 143 from being easily withdrawn from the slot 133 in a state in which the link pin 143 is inserted into the slot 133.

Referring to FIG. 7, the slot 133 is formed in the "U" shape.

The clip 133a is formed in a "U" shape corresponding to the open surface of the slot 133 and is snap-fit-coupled to the slot 133.

In this case, the clip 133a may be formed in a form detachable from the slot 133.

Sixth Embodiment

Figure 8:
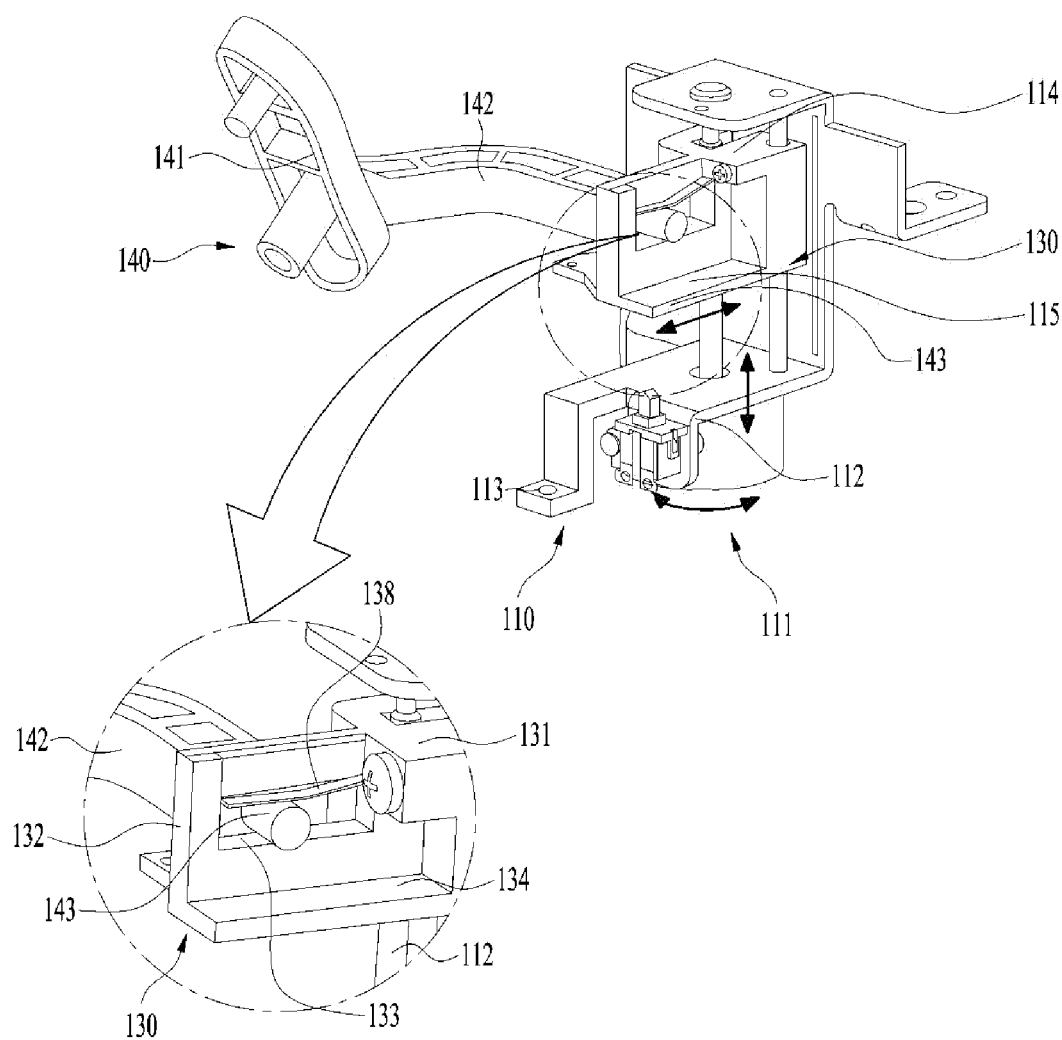
FIG. 8 is a schematic view illustrating an actuator module of a vehicle head-up display according to a sixth embodiment of the present invention.
Figure 9:
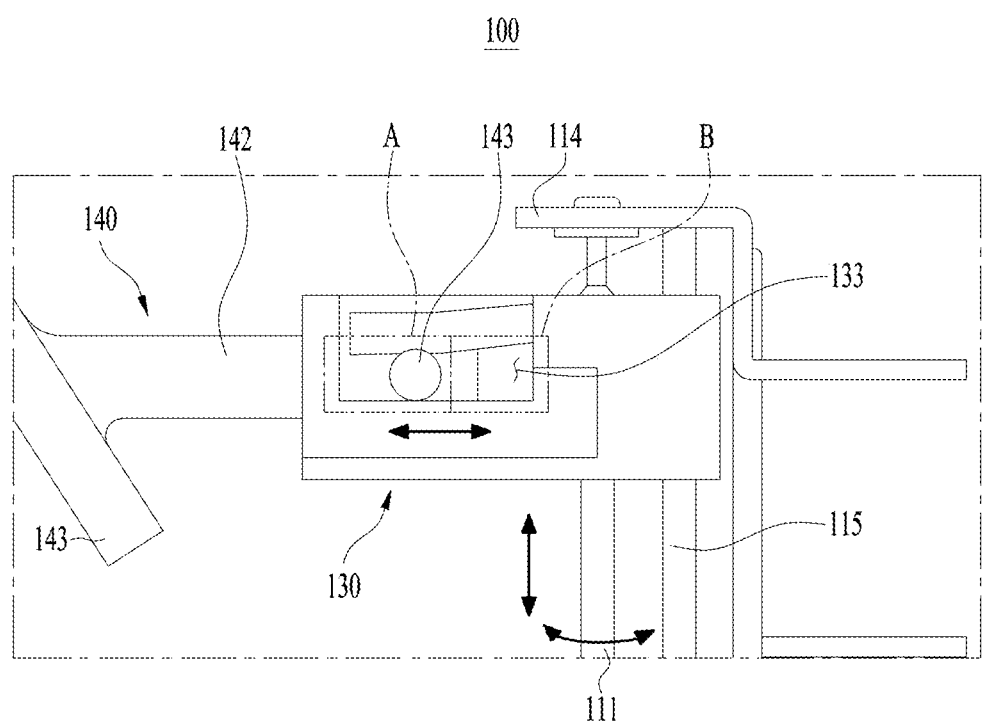
FIG. 9 is a view illustrating a coupling relationship between a link pin passing through a slot and a leaf spring in the actuator module of a vehicle head-up display according to the sixth embodiment of the present invention.

FIG. 8 is a schematic view illustrating an actuator module of a vehicle head-up display according to a sixth embodiment of the present invention, and FIG. 9 is a view illustrating a coupling relationship between a link pin passing through a slot and a leaf spring.

Referring to FIGS. 8 and 9 together, a leaf spring 138 is formed in a shape inclined in a downward direction from a main body 131 toward a vertical plate 132.

That is, the leaf spring 138 is formed of a snap type plastic material engaged with a link pin 143. The leaf spring 138 provides as much of an elastic force to the link pin 143 to be displaced in the slot 133 without a gap.

The slot 133 is formed in a long hole shape in a driving transmission unit 130. In this case, the slot 133 is divided into a tilting area A and a parking area B.

In this case, the tilting area A denotes a displacement area of the link pin 143 of a link unit 140 which operates in conjunction with an aspheric mirror 10 when the aspheric mirror 10 rotates in an axial direction.

The parking area B denotes a position of the link pin 143 when the aspheric mirror 10 is in a parking state in which the aspheric mirror 10 is not rotated any more.

In this case, the parking area B is a space for facilitating assimilability between the link pin 143 of the link unit 140 and the slot 133.

Accordingly, a width of the parking area B may be relatively greater than a width of the tilting area A in a vertical direction.

Seventh Embodiment

Figure 10:
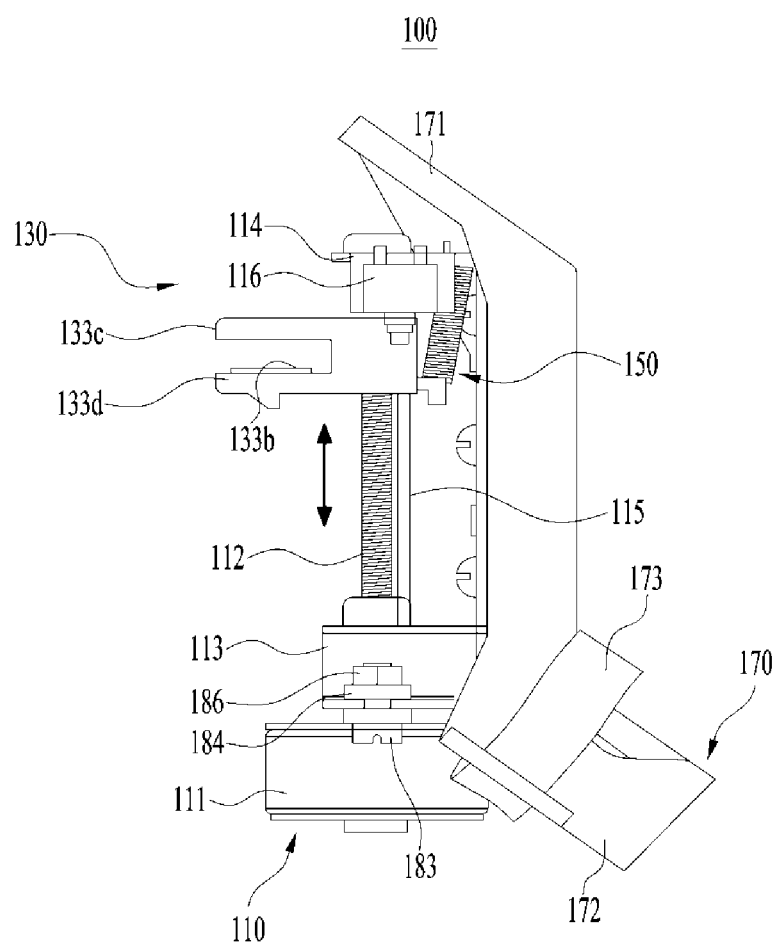
FIGS. 10 and 11 are schematic views illustrating an actuator module of a vehicle head-up display according to a seventh embodiment of the present invention.
Figure 11:
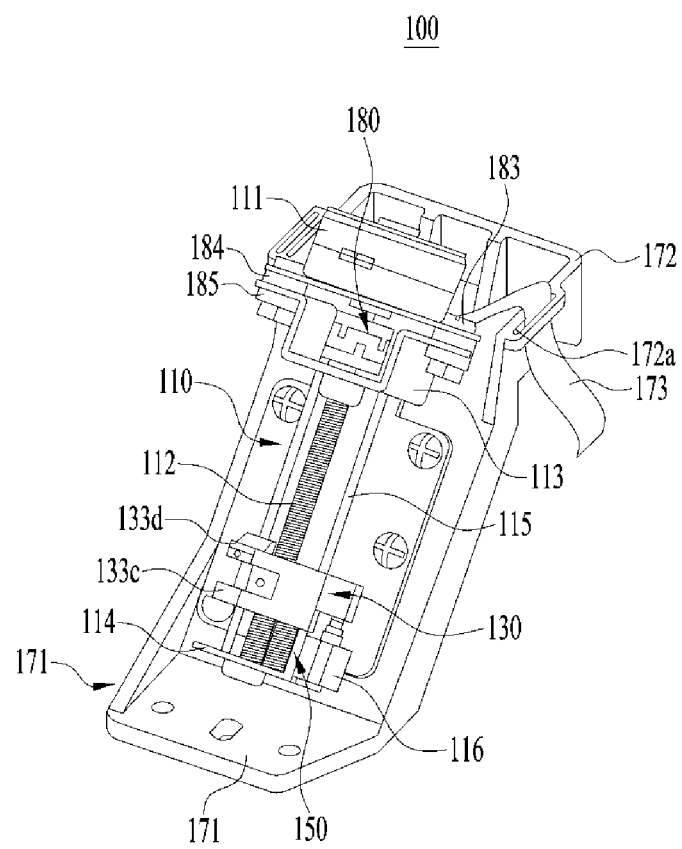
Figure 12:
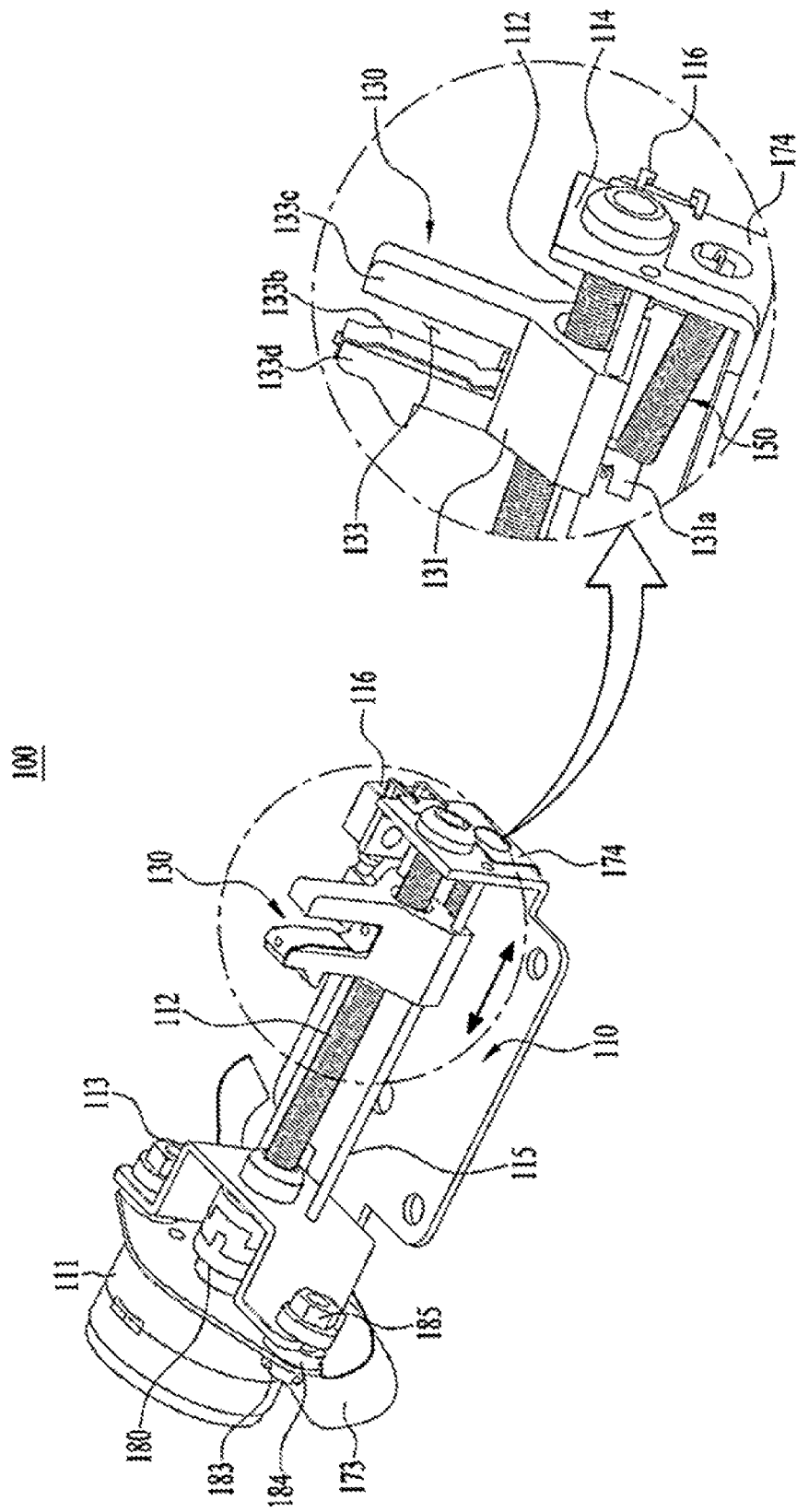
FIG. 12 is an enlarged partial view illustrating the actuator module of a vehicle head-up display according to the seventh embodiment of the present invention.
Figure 13:
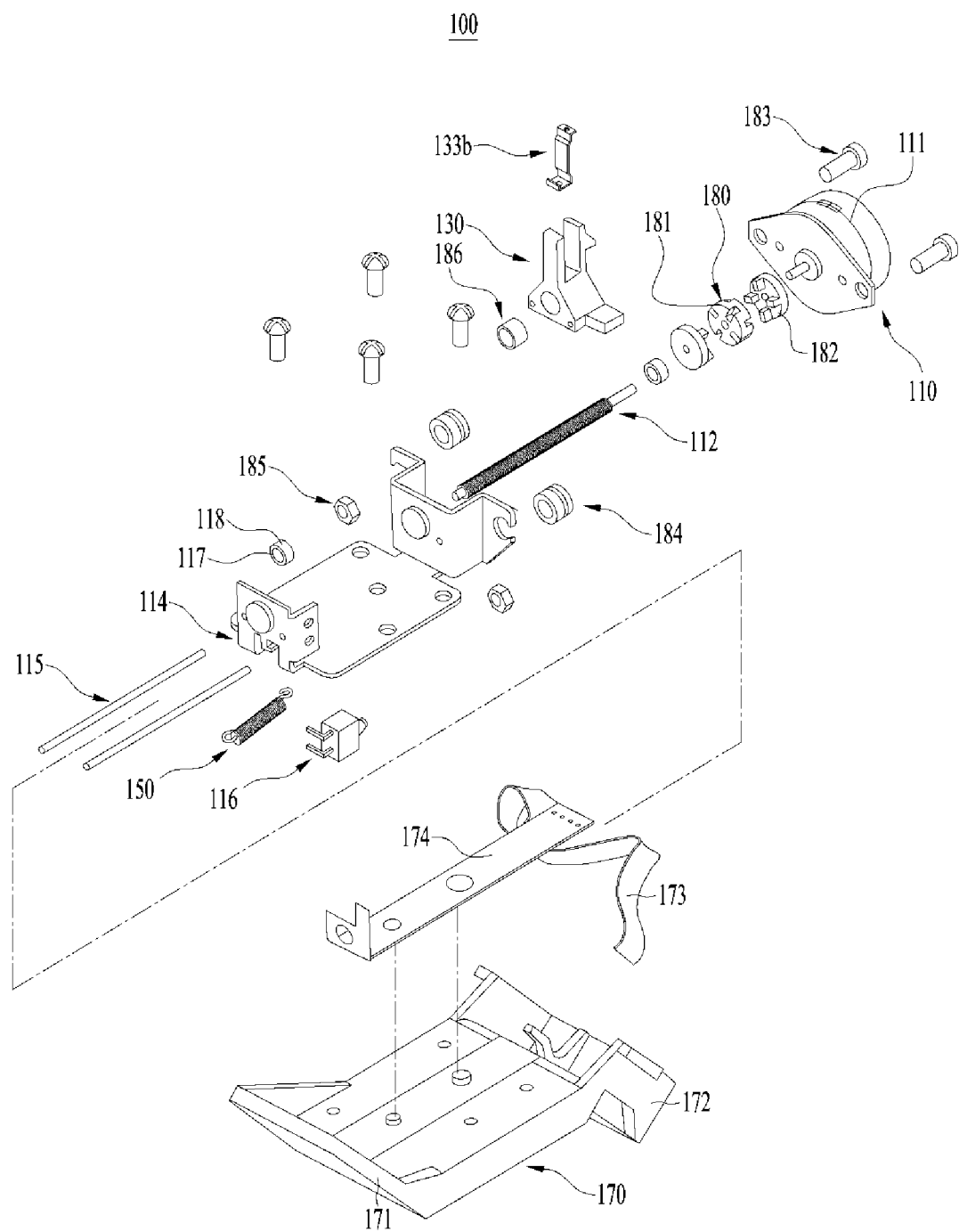
FIG. 13 is an exploded view illustrating a detailed structure of the actuator module of a vehicle head-up display according to the seventh embodiment of the present invention.

FIGS. 10 and 11 are schematic views illustrating an actuator module of a vehicle head-up display according to a seventh embodiment of the present invention, FIG. 12 is an enlarged partial view illustrating the actuator module, and FIG. 13 is an exploded view illustrating a detailed structure of the actuator module.

Referring to FIGS. 10 to 13 together, an actuator module 100 of a vehicle head-up display includes a driving unit 110, a driving transmission unit 130, an elastic part 150, and a motor mount 170.

The actuator module 100 according to the seventh embodiment has a structure in which the actuator module 100 drives an aspheric mirror 10 (see FIG. 6) like the above-described embodiments but has a structure of the driving transmission unit 130 different from those of the above-described embodiments and additionally includes the motor mount 170.

Hereinafter, repeated descriptions will be omitted and differences will be described.

Upward and downward movement of the driving transmission unit 130 is controlled only within a section preset by the driving unit 110, and the driving transmission unit 130 includes a main body 131, a slot 133, and a clip 133b.

The slot 133 extends from the main body 131 and formed in a shape of which one surface is open. A protrusion is formed on an outer side of the slot 133 to be diagonally inclined in a downward direction from an upper portion toward a lower portion.

The slot 133 includes first and second grip members 133c and 133d extending from upper and lower portions of the main body 131 toward the other end of the driving unit 110 to be spaced apart from each other. In this case, the motor mount 170 is installed at one side of the driving unit 110, and the slot 133 is positioned at the other side of the driving unit 110.

The clip 133b is positioned on any one of inner side surfaces of the first and second grip members 133c and 133d in order for the link pin 143 (see FIG. 9) not to be withdrawn from the slot 133 and has a leaf spring structure.

The clip 133b is snap-fit-coupled from a side of the open surface of the slot 133. That is, the clip 133b may be snap-fit-coupled to any one of the inner side surfaces of the first and second grip members 133c and 133d of the slot 133.

The clip 133b does not close the open surface of the slot 133. However, the clip 133b does not allow the link pin 143 (see FIG. 6) to be easily withdrawn from the slot 133 in a state in which the clip 133b at least partially closes the open slot 133.

Accordingly, the clip 133b may correct a gap of the aspheric mirror 10 (see FIG. 6).

The driving transmission unit 130 includes a connecting jaw 131a under the main body 131. The connecting jaw 131a is provided as a structure into which the elastic part 150 is inserted and connected thereto.

Accordingly, the driving transmission unit 130 may correct the gap using a tensile force of the elastic part 150 connected to the connecting jaw 131a.

The motor mount 170 surrounds and protects a driving motor 111, and the driving motor 111 is installed in a central portion of a body.

An upper mount 171 and a lower mount 172 are respectively formed on upper and lower portions of the motor mount 170. The upper mount 171 and the lower mount 172 have structures diagonally bent with respect to the body of the motor mount 170.

A plurality of holes, into which bolts and the like are inserted, are formed in each of the upper mount 171 and the lower mount 172 to be spaced apart from each other.

An anti-vibration coupling 180 is positioned between and connected to the driving motor 111 and the lower frame 113. Particularly, in a state in which motor pads 184 are inserted into both ends of the lower frame 113, shoulder bolts 183 pass through the motor pads 184. Flange nuts 185 are fixed to end portions of the shoulder bolts 183.

Since the motor pad 184 formed of a rubber material is used, vibration of the driving motor 111 is not transmitted to the lower frame 113.

A shaft of the driving motor 111 is connected to the anti-vibration coupling 180. Accordingly, since the anti-vibration coupling 180 is used, the vibration of the driving motor 111 is not transmitted to the lower frame 113.

Meanwhile, a switch 116 connected to the upper frame 114 is provided as a structure in contact with the driving transmission unit 130 on a passage along which the driving transmission unit 130 moves in a longitudinal direction of a lead screw 112.

The switch 116 is a component for detecting a driving limit point of the aspheric mirror 10 (see FIG. 6). Accordingly, since the switch 116 may be positioned at an end portion of the lead screw 112, the switch 116 may also be connected to the lower frame 113.

Figure 14:
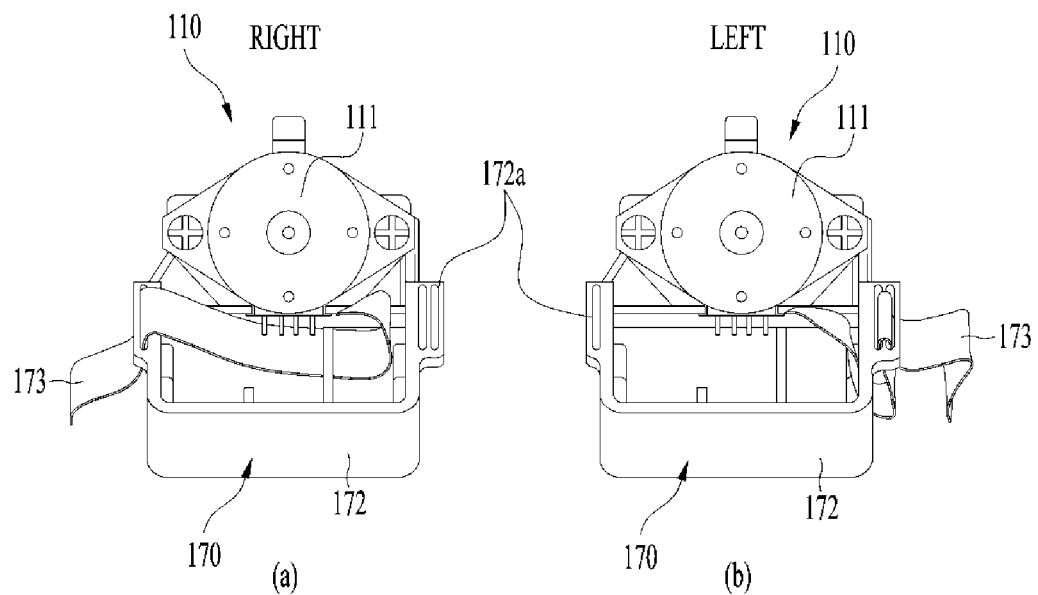
FIG. 14 is a view illustrating an example of use of a flexible cable in the actuator module of a vehicle head-up display according to the seventh embodiment of the present invention.

FIG. 14 is a view illustrating an example of use of a flexible cable in the actuator module of a vehicle head-up display according to the seventh embodiment of the present invention.

Referring to FIG. 14, a cable slit 172a is formed in the lower mount 172 of the motor mount 170. A flexible cable 173, which is a conductive wire of the driving motor 111, is inserted into the cable slit 172a.

In this case, as illustrated in FIG. 14, since the flexible cable 173 is formed in a common structure, the flexible cable 173 may be installed in any direction of left and right directions of the driving motor 111.

Accordingly, a direction of the flexible cable 173 is changed and the flexible cable 173 is connected without installing an additional cable for each installation position of the driving motor 111. Since the flexible cable 173 is used, a cost is reduced.

According to the present invention, the generation of a gap between contact portions (a slot and a link pin) for driving an aspheric mirror of a vehicle head-up display can be prevented using an elastic force of an elastic part.

That is, according to the present invention, a backlash of a lead screw and a gap between a link unit and a driving transmission unit can be removed at the same time by directly applying the elastic force to the aspheric mirror.

Accordingly, according to the present invention, an error factor of the contact portions related to driving can be reduced and a load of a driving unit can be reduced using the elastic part formed as one spring.

The present invention is not limited to the above-described embodiments and may be variously changed and implemented in the range allowed by the technical spirit of the present invention.

What is claimed is:

1. An actuator module comprising:
    a driving unit comprising (1) a driving motor disposed at a lower portion of the driving unit and (2) a lead screw extending from the driving motor in a first direction and functioning as a driving axis of the driving motor;
    a driving transmission unit configured to perform upward and downward movement within a section preset by the driving unit;
    a link unit positioned between and connected to an aspheric mirror and the driving transmission unit and configured to adjust a rotational angle of the aspheric mirror according to the upward and downward movement of the driving transmission unit;
    a motor mount connected to a first side of the driving unit and having a space for an adjacent component and a plurality of cables; and
    an elastic part spaced apart from the lead screw and elastically extending in the first direction between the lower portion of the driving unit and the driving transmission unit and configured to urge the driving transmission unit toward the lower portion of the driving unit,
    wherein the driving unit further comprises a guide shaft spaced apart from the lead screw and the elastic part, extending in parallel to the lead screw, and configured to guide the upward and downward movement of the driving unit.

2. The actuator module of claim 1, wherein the driving transmission unit comprises:
    a main body configured to perform the upward and downward movement in a longitudinal direction according to rotational driving of the lead screw;
    a slot formed in a structure extending from the main body and coupled to a link pin formed at an end portion of the link unit; and
    a clip configured to prevent a gap from being generated between the link pin and the slot.

3. The actuator module of claim 2, wherein:
    the slot comprises first and second grip members extending from upper and lower end portions of the main body, respectively, and extending toward a second side of the driving unit to be spaced apart from each other, and
    the clip has a leaf spring structure disposed on any one of inner side surfaces of the first and second grip members to prevent the link pin from withdrawing from the slot.

4. The actuator module of claim 3, wherein the clip is snap-fit-coupled to any one of the inner side surfaces of the first and second grip members of the slot.

5. The actuator module of claim 1, wherein the driving unit further comprises:
    a lower frame disposed at the lower portion of the driving unit and surrounding the driving motor, wherein the lead screw passes through the lower frame; and
    an upper frame disposed at an upper portion of the driving unit and surrounding an end portion of the lead screw in a longitudinal direction of the lead screw such that the end portion is rotatable, and
    wherein the guide shaft is positioned between the lower frame and the upper frame of the driving unit, wherein the lower frame comprises a motor pad configured to reduce vibration of the driving motor.

6. The actuator module of claim 5, wherein:
the driving transmission unit is configured to move in the longitudinal direction of the lead screw,
the upper frame comprises a switch positioned on a moving passage of the driving transmission unit and in contact with the driving transmission unit, and
the switch is positioned at an end of the moving passage of the driving transmission unit and configured to detect a driving end point of the aspheric mirror.

7. The actuator module of claim 5, wherein:
the lower frame has a coupling hole, and
the elastic part has a first end engaged to the coupling hole of the lower frame and a second end coupled to the driving transmission unit.

8. An actuator module comprising:
a driving unit comprising (1) a driving motor disposed at a lower portion of the driving unit and (2) a lead screw extending from the driving motor in a first direction and functioning as a driving axis of the driving motor;
a driving transmission unit configured to perform upward and downward movement within a section preset by the driving unit;
a link unit configured to adjust a tilting angle of an aspheric mirror in conjunction with the driving transmission unit; and
an elastic part elastically extending in the first direction between the lower portion of the driving unit and the driving transmission unit,
wherein the driving transmission unit comprises a main body, a slot extending from the main body and having an open surface, and a clip covering the open surface of the slot,
wherein the slot has a first "U" shape, and the clip has a second "U" shape corresponding to the open surface of the slot and snap-fit-coupled to the open surface.

9. The actuator module of claim 8, wherein:
a link pin protrudes from an end portion of the link unit, and
the driving transmission unit comprises:
a vertical plate configured to close the open surface of the slot; and
a snap stick bent inward and outward in a lateral direction and engaged with the link pin,
wherein the snap stick has a portion overlapping the link pin and engaged with the link pin to restrict displacement of the link pin.

* * * * *